US009971618B2

(12) United States Patent
Lagergren et al.

(10) Patent No.: US 9,971,618 B2
(45) Date of Patent: May 15, 2018

(54) SYSTEM AND METHOD TO RECONFIGURE A VIRTUAL MACHINE IMAGE SUITABLE FOR CLOUD DEPLOYMENT

(71) Applicant: ORACLE INTERNATIONAL CORPORATION, Redwood Shores, CA (US)

(72) Inventors: Marcus Lagergren, Stockholm (SE); Mikael Vidstedt, Solna (SE)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 791 days.

(21) Appl. No.: 14/290,427

(22) Filed: May 29, 2014

(65) Prior Publication Data

US 2014/0282548 A1     Sep. 18, 2014

Related U.S. Application Data

(63) Continuation of application No. 12/853,053, filed on Aug. 9, 2010, now Pat. No. 8,776,053.

(60) Provisional application No. 61/246,050, filed on Sep. 25, 2009.

(51) Int. Cl.
    *G06F 9/455*     (2006.01)
    *G06F 9/50*      (2006.01)

(52) U.S. Cl.
    CPC ........ *G06F 9/45558* (2013.01); *G06F 9/5077* (2013.01); *G06F 2009/45562* (2013.01)

(58) Field of Classification Search
    CPC .................................................. G06F 9/5077
    USPC ............................................................ 708/1
    See application file for complete search history.

(56) References Cited

U.S. PATENT DOCUMENTS

| 8,156,301 | B1  | 4/2012  | Khandelwal |
| 8,176,486 | B2  | 5/2012  | Husain |
| 8,219,653 | B1* | 7/2012  | Keagy .................. G06F 8/63  709/222 |
| 8,321,558 | B1  | 11/2012 | Sirota |

(Continued)

FOREIGN PATENT DOCUMENTS

EP     2019358     1/2009

OTHER PUBLICATIONS

European Patent Office International Searching Authority, International Search Report and Written Opinion for PCT International Patent Application No. PCT/US2010/036732, dated Nov. 30, 2010, 11 pages.

(Continued)

*Primary Examiner* — Sujay Koneru
(74) *Attorney, Agent, or Firm* — Tucker Ellis LLP

(57) ABSTRACT

A system and method for reconfiguring a virtual server image suitable for cloud deployment. In accordance with an embodiment, the system comprises providing a virtual server image, which can be executed on one or a plurality of hypervisors, and which contains a bootable part of a virtual machine, a non-bootable part of the virtual machine, a software application code for a software application, and a software application data for the software application. Information in a virtual server image patch can be used to reconfigure the contents of the virtual server image from its original content to a reconfigured content, to create a reconfigured virtual server image. In a particular embodiment, the virtual machine can be a Java Virtual Machine.

20 Claims, 5 Drawing Sheets

(56) References Cited

U.S. PATENT DOCUMENTS

| | | | |
|---|---|---|---|
| 8,381,264 B1 | 2/2013 | Corddry | |
| 8,458,717 B1 | 6/2013 | Keagy | |
| 8,468,535 B1 | 6/2013 | Keagy | |
| 2005/0120219 A1* | 6/2005 | Munetoh | G06F 21/52 713/176 |
| 2005/0198303 A1* | 9/2005 | Knauerhase | G06F 9/5055 709/227 |
| 2006/0271827 A1* | 11/2006 | Cascaval | G06F 11/3466 714/39 |
| 2007/0033586 A1 | 2/2007 | Hirsave | |
| 2007/0239979 A1* | 10/2007 | Berger | H04L 63/102 713/150 |
| 2007/0294676 A1 | 12/2007 | Mellor | |
| 2007/0300205 A1 | 12/2007 | Scian | |
| 2008/0201414 A1 | 8/2008 | Husain | |
| 2008/0209429 A1* | 8/2008 | Van Riel | G06F 9/505 718/104 |
| 2008/0263258 A1 | 10/2008 | Allwell | |
| 2008/0271016 A1 | 10/2008 | Chess | |
| 2008/0295092 A1 | 11/2008 | Tan | |
| 2009/0006534 A1 | 1/2009 | Fries | |
| 2009/0036111 A1 | 2/2009 | Danford | |
| 2009/0070752 A1 | 3/2009 | Alpern | |
| 2009/0094603 A1 | 4/2009 | Hiltgen | |
| 2009/0100420 A1* | 4/2009 | Sapuntzakis | G06F 8/65 717/171 |
| 2009/0113423 A1 | 4/2009 | Hiltgen | |
| 2009/0164994 A1 | 6/2009 | Vasilevsky | |
| 2009/0172662 A1* | 7/2009 | Liu | G06F 9/44505 718/1 |
| 2009/0276771 A1 | 11/2009 | Nickolov | |
| 2009/0319688 A1 | 12/2009 | Mason | |
| 2010/0027552 A1 | 2/2010 | Hill | |
| 2010/0070970 A1 | 3/2010 | Hu | |
| 2010/0115174 A1 | 5/2010 | Akyol | |
| 2010/0162238 A1 | 6/2010 | Warfield | |
| 2010/0223383 A1 | 9/2010 | Salevan | |
| 2010/0250744 A1 | 9/2010 | Hadad | |
| 2010/0287280 A1* | 11/2010 | Sivan | G06F 9/5072 709/226 |
| 2010/0306599 A1 | 12/2010 | Cota-Robles | |

OTHER PUBLICATIONS

Krsul, et al., VMPlants: Providing and Managing Virtual Machine Execution Environments for Grid Computing, 2004, 12 pages.

* cited by examiner

SYSTEM AND METHOD TO RECONFIGURE A VIRTUAL MACHINE IMAGE SUITABLE FOR CLOUD DEPLOYMENT

CLAIM OF PRIORITY

This application is a continuation of U.S. patent application Ser. No. 12/853,053, entitled "SYSTEM AND METHOD TO RECONFIGURE A VIRTUAL MACHINE IMAGE SUITABLE FOR CLOUD DEPLOYMENT", filed Aug. 9, 2010, now U.S. Pat. No. 8,776,053 issued Jul. 8, 2014 and which claims the benefit of priority to U.S. Provisional Patent Application No. 61/246,050, titled "SYSTEM AND METHOD TO RECONFIGURE A VIRTUAL MACHINE IMAGE SUITABLE FOR CLOUD DEPLOYMENT", filed Sep. 25, 2009; and is related to U.S. patent application Ser. No. 12/476,103, entitled "SYSTEM AND METHOD FOR CONVERTING A JAVA APPLICATION INTO A VIRTUAL SERVER IMAGE FOR CLOUD DEPLOYMENT", filed Jun. 1, 2009 now U.S. Pat. No. 8,856,294 issued Oct. 7, 2014; each of which applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The invention is generally related to application servers and virtual machines, and particularly to a system and method to reconfigure a virtual machine image comprising a Java Virtual Machine and a Java application, suitable for cloud deployment.

BACKGROUND

Cloud computing is generally defined as a form of computing in which dynamic and/or virtualized resources are provided as services over a distributed network of physical computing machines or servers, such as the Internet. Client processes, software applications, and users thereof, are not required to have explicit knowledge or control over the technology infrastructure within the cloud. Instead, they can request or call upon services from the cloud, which are then provided by other providers within the cloud. As such, cloud computing promises software application developers with an easy means way of deploying their application to run simultaneously upon thousands of servers in a cloud.

To date, different solutions of deploying software applications in a cloud have emerged that are generally cloud specific, i.e. the applications need to conform to a cloud/hypervisor specific application program interface (API) to run on their servers. Using this methodology, it is not easy for a cloud customer to migrate an application from one cloud provider to another cloud provider. Cloud providers can address this problem somewhat by offering hypervisors in their clouds. Generally, a hypervisor acts as a layer between a server's hardware and its operating system. This provides an abstraction layer that allows each physical server to run one or more virtual servers, and effectively decouples the operating system and its applications from the underlying physical server. When used in a cloud, the cloud customer can supply a virtual machine image which contains the customer application to the hypervisor. The image will then be booted in potentially thousands of hypervisors in the cloud. Since there are generally only a few hypervisor types this approach standardizes the format for how the application developer has to package the application. Instead of creating a standalone application that fits into a specific cloud API, the developer now has to create a suitable virtual machine image.

However, such a created virtual machine image can be large, depending on the Java application contained therein. The image can also grow in size when the virtual machine image is executed. For example, application generated data and log files can be stored within the image, and such an image can grow to several gigabytes in size. Since it is usually unavoidable that the Java application or the Java virtual machine (JVM) contained within the virtual machine image will have to be updated there is a need for a tool that can efficiently update such a virtual server image and do so without disturbing the accumulated application data.

SUMMARY

Disclosed herein is a system and method that can be used to reconfigure a virtual server image comprising a Java virtual machine and a Java application, that is suitable for cloud deployment. In accordance with an embodiment, the system and method allows for updating a Java virtual machine and its configuration, inside a virtual server image. In accordance with another embodiment, the Java virtual machine is bootable and comprises a minimal operating system suitable only to run a single Java virtual machine instance. In accordance with another embodiment, the system and method allows for updating the Java application within the virtual server image. In particular, the virtual server image can be compatible with any hypervisor for server virtualization and the application virtual machine can be a Java Virtual Machine (JVM) or any other virtual machine for running software applications.

In accordance with an embodiment, the system includes a virtual server image updater, that allows the system to take a virtual server image and reconfigure it according to a specification within a virtual server image patch. The reconfigured virtual server image can then be deployed in a hypervisor, or for example within a cloud of hypervisors. In accordance with another embodiment the virtual server image patch is distributed to the computers within a cloud and applied locally on each computer. In another embodiment the Java application is suspended, followed by a shutdown of the virtual server image, the virtual server image is then patched, and finally the virtual server is booted and the Java application resumed.

In accordance with an embodiment, the updater will create an inverse virtual server image patch that, when applied to the reconfigured virtual server image, will restore it to its original state.

DETAILED DESCRIPTION

Figure 1:
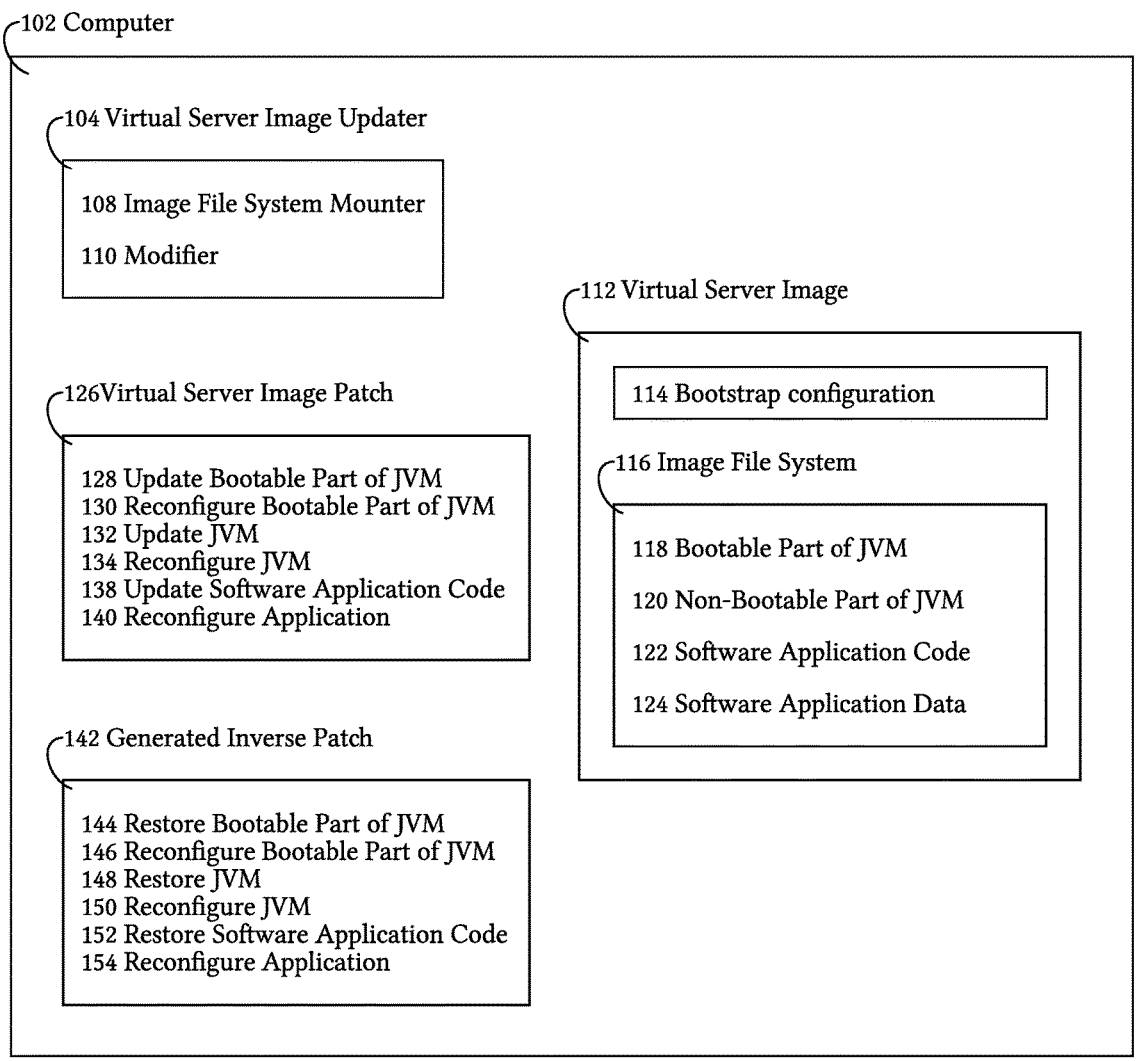
FIG. 1 shows an illustration of a system in accordance with an embodiment.

Disclosed herein is a system and method that can be used to reconfigure a virtual server image comprising a Java virtual machine and a Java application, that is suitable for cloud deployment. In accordance with an embodiment, the system and method allows for updating a Java virtual machine and its configuration, inside a virtual server image. In accordance with another embodiment, the Java virtual machine is bootable and comprises a minimal operating system suitable only to run a single Java virtual machine instance. In accordance with another embodiment, the system and method allows for updating the Java application within the virtual server image. In particular, the virtual server image can be compatible with any hypervisor for server virtualization and the application virtual machine can be a Java Virtual Machine (JVM) or any other virtual machine for running software applications.

Cloud computing is generally defined as a form of computing in which dynamic and/or virtualized resources are provided as services over a distributed network of physical computing machines or servers, such as the Internet. Client processes, software applications, and users thereof, are not required to have explicit knowledge or control over the technology infrastructure within the cloud. Instead, they can request or call upon services from the cloud, which are then provided by other providers within the cloud. As such, cloud computing promises software application developers with an easy means way of deploying their application to run simultaneously upon thousands of servers in a cloud.

To date, different solutions of deploying software applications in a cloud have emerged that are generally cloud specific, i.e. the applications need to conform to a cloud/hypervisor specific application program interface (API) to run on their servers. Using this methodology, it is not easy for a cloud customer to migrate an application from one cloud provider to another cloud provider.

Cloud providers can address this problem somewhat by offering hypervisors in their clouds. Generally, a hypervisor acts as a layer between a server's hardware and its operating system. This provides an abstraction layer that allows each physical server to run one or more virtual servers, and effectively decouples the operating system and its applications from the underlying physical server. When used in a cloud, the cloud customer can supply a virtual machine image which contains the customer application to the hypervisor. The image will then be booted in potentially thousands of hypervisors in the cloud. Since there are generally only a few hypervisor types this approach standardizes the format for how the application developer has to package the application. Instead of creating a standalone application that fits into a specific cloud API, the developer now has to create a suitable virtual machine image.

The patent application to U.S. patent application Ser. No. 12/476,103, titled "SYSTEM AND METHOD FOR CONVERTING A JAVA APPLICATION INTO A VIRTUAL SERVER IMAGE FOR CLOUD DEPLOYMENT", filed Jun. 1, 2009, the disclosure of which is hereby incorporated by reference, teaches how to create such a virtual machine image automatically from a Java application. Such a created virtual machine image can be large, depending on the Java application contained therein. The image can also grow in size when the virtual machine image is executed. For example, application generated data and log files can be stored within the image, and such an image can grow to several gigabytes in size.

Since it is usually unavoidable that the Java application or the JVM contained within the virtual machine image will have to be updated there is a need for a tool that can efficiently update such a virtual server image and do so without disturbing the accumulated application data.

In accordance with an embodiment, the system includes a virtual server image updater that allows the system to take a virtual server image and reconfigure it according to a specification within a virtual server image patch. The reconfigured virtual server image can then be deployed in a hypervisor, or for example within a cloud of hypervisors. In accordance with another embodiment the virtual server image patch is distributed to the computers within a cloud and applied locally on each computer. In another embodiment the Java application is suspended, followed by a shutdown of the virtual server image, the virtual server image is then patched, and finally the virtual server is booted and the Java application resumed.

In accordance with an embodiment, the updater will create an inverse virtual server image patch that, when applied to the reconfigured virtual server image, will restore it to its original state. The virtual server image updater addresses the following problems or features:

Efficiency of updating a virtual server image. The bootable part of the Java virtual machine is significantly smaller than a general purpose operating system. This makes it possible to upgrade both the bootable, and the non-bootable, part of the JVM with a minimal patch file.

Ability to update properties in the bootable part of the JVM, comprising how many cpu's to expose to the non-bootable part of the JVM, as well as the maximum amount of physical ram and disk.

Ability to update the startup arguments for the non-bootable part of the JVM.

Ability to reconfigure the Java application and its startup arguments without disturbing the Java application data and state.

Ability to rewrite the virtual server image from one hypervisor to a different hypervisor without disturbing the Java application data or state.

Ease of use. An administrative person is provided with a tool that works on finished appliances without the need for unpacking, patching and then recreating the appliance.

A typical use of the virtual server image updater would be to take a virtual server image comprising a Weblogic Virtual Edition (VE) installation and reconfigure the virtual server image in such a way that: the Java virtual machine is upgraded to a newer version, both the bootable part and the non-bootable part; the bootable part of the Java virtual machine should use four virtual cpu's; the startup arguments for non-bootable part of the Java virtual machine that later starts Weblogic VE are modified to include a -Xms512M, to set the startup size of the Java heap; and a jar file within the Weblogic installation is replaced with a new jar file, and a configuration file is updated.

java -jar updater.jar [patch_file] [virtual_server_image_file]

In accordance with an embodiment, a patch file can be created for this setup as:

```
<reconfigure>
    <new-bootable>..Base64 encoded archive...</new-bootable>
    <add-to-bootable-config>-cpu=4</add-to-bootable-config>
    <new-JVM>..Base64 encoded archive...</new-JVM>
    <add-to-jvm-config>-Xms512M</add-to-jvm-config>
    <new-jar-file file="/app/lib/setup.jar">..Base64 encoded jar...
    </new-jar-file>
    <patch file="/app/etc/setup.cfg">..Base64 encoded diff...
    </patch>
</reconfigure>
```

FIG. 1 shows an illustration of a system in accordance with an embodiment of the invention. As shown in FIG. 1, the system includes a computer 102 with a general operating system executing thereon. The computer maintains a virtual server image updater 104, comprising a file system mounter 108, and a modifier 110. The updater works on a virtual server image 112, comprising a bootstrap (or bootsector) configuration 114, and a file system 116. The file system comprises the bootable part of the JVM 118, the non-bootable part of the JVM 120, the software application code 122, and the software application data 124.

In accordance with an embodiment, the modifier 110 reads a virtual server image patch 126 comprising one or more of a new bootable part of the JVM 128, a reconfiguration of the bootable part of the JVM 130, a new non-bootable part of the JVM 132, a reconfiguration of the non-bootable part of the JVM 134, a new software application code 138, and a reconfiguration of the software application 140.

When the updater has performed the changes to the virtual server image as specified by the virtual server image patch, an inverse patch 142 is generated. The inverse patch comprises the previous bootable part of the JVM 144, the previous configuration of the bootable part 146, the previous JVM 148, the previous configuration of the JVM 150, the previous software application code 152, and the previous configuration for the software application 154. If the updater 104 is immediately executed with the inverse image patch 142 on the virtual server image 112, then all the changes are reversed.

Figure 2:
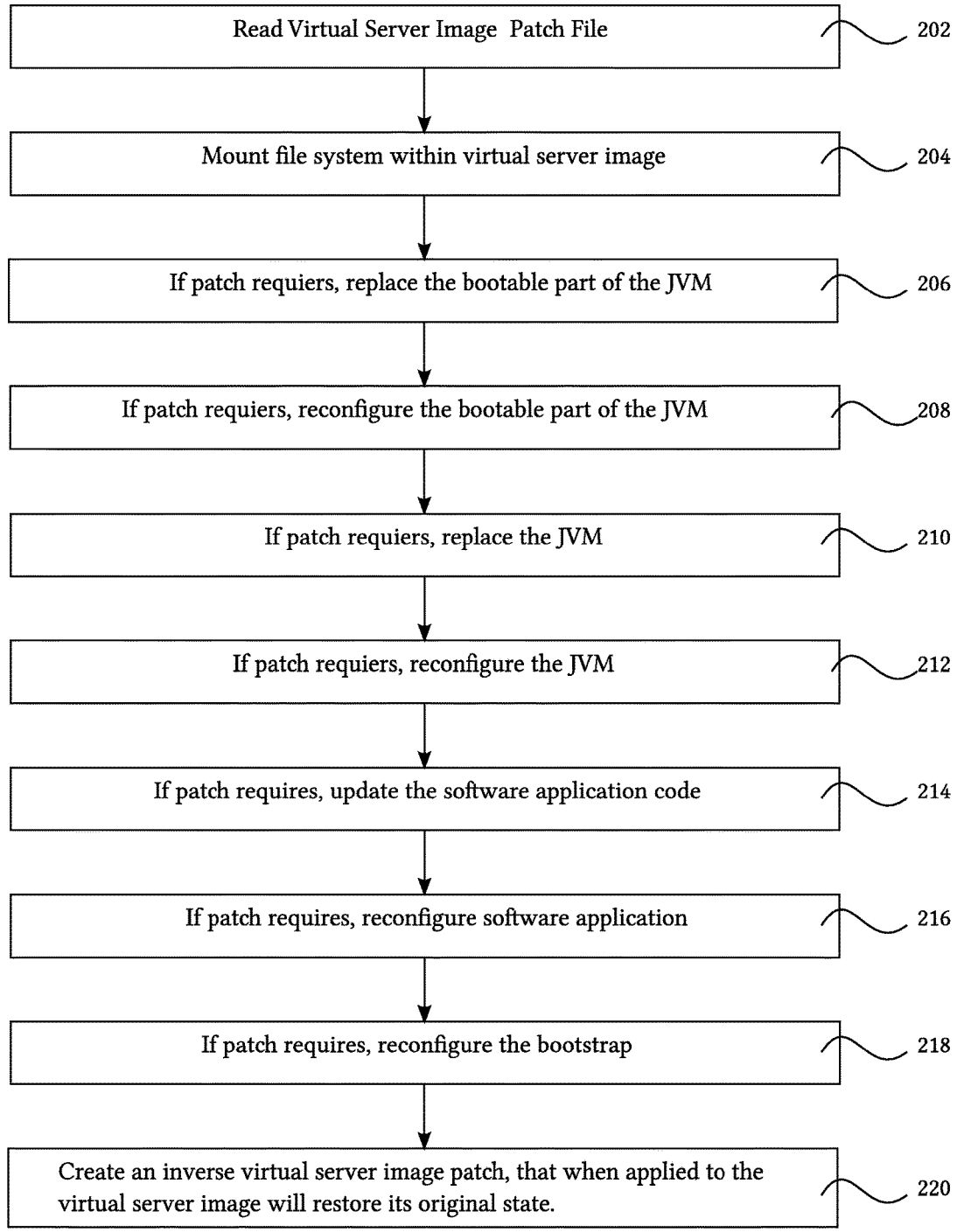
FIG. 2 shows a flowchart of a method in accordance with an embodiment, for reconfiguring a virtual server image.

FIG. 2 shows a flowchart of a method in accordance with an embodiment, for generating a Java virtual machine (JVM) appliance. In accordance with an embodiment, the appliance builder is first started on the system as a standard Java application, such as:

java -jar updater.jar [patch_file] [virtual_server_image_file]

As shown in FIG. 2, in step 202, the updater reads the patch file, and uses the instructions from the patch file to determine how to reconfigure the virtual server image. In step 204, the updater mounts the file system located within the virtual server image. A file system contained within a file can generally be mounted using operating system tools (usually a loop-back device). The code to read and write the file system can also be implemented in the updater itself. In accordance with an embodiment, the file system is an ext2 file system commonly used in the operating system GNU/Linux, and the ext2 file system read and write, as well as the updater, are implemented in Java.

In step 206, if the patch so requires, the bootable part of the JVM is replaced with the one supplied within the patch.

In accordance with an embodiment, the bootable part of the JVM is located within a subdirectory named /baremetal within the file system within the virtual server image. In an embodiment the bootable binary comprises /baremetal/boot-.bin. The updater will replace this directory and its contents with the bootable part supplied by the patch. In step 208, if the patch so requires, the bootable part of the JVM is reconfigured, for example by updating the /bm.conf file located within the file system using the specification from the patch file, (in an embodiment using a process similar to how a standard posix tools diff/patch works).

In step 210, if the patch so requires, the non-bootable part of the JVM is replaced (in an embodiment it is located within the subdirectory /jvm) using the same process as the bootable-part of the JVM was replaced. In step 212, the configuration for starting the non-bootable part of the JVM is changed in the same way as the configuration for the bootable part. In accordance with an embodiment the configurations for both the bootable and the non-bootable parts are located within the same /bm.conf file.

In step 214, if the patch so requires the system applies changes to the software application code (in an embodiment located within the directory /application). In step 216, if the patch so requires the system reconfigures the software application in the same way as the previous reconfigurations were performed.

In step 218, if the patch so requires, the bootstrap configuration is updated. For example, for virtual server images compatible with VMWare, the bootstrap configuration is embedded in the bootsector of the virtual server image. For virtual server images compatible with Xen/OracleVM the bootstrap configuration is located within the subdirectory /boot/menu.cfg within the file system within the virtual server image.

In accordance with an embodiment, in step 220, an inverse patch file is generated by the updater. If the inverse patch file is applied to the reconfigured virtual server image, then the original state will be restored. The inverse patch comprises information from the virtual server image (in an embodiment the subdirectory /baremetal), and can therefore not be created before the actual patch is applied to the virtual server image. The other changes are easily calculated from the patch file, for example:

add-to-jvm-config is replaced with remove-from-jvm-config

Figure 3:
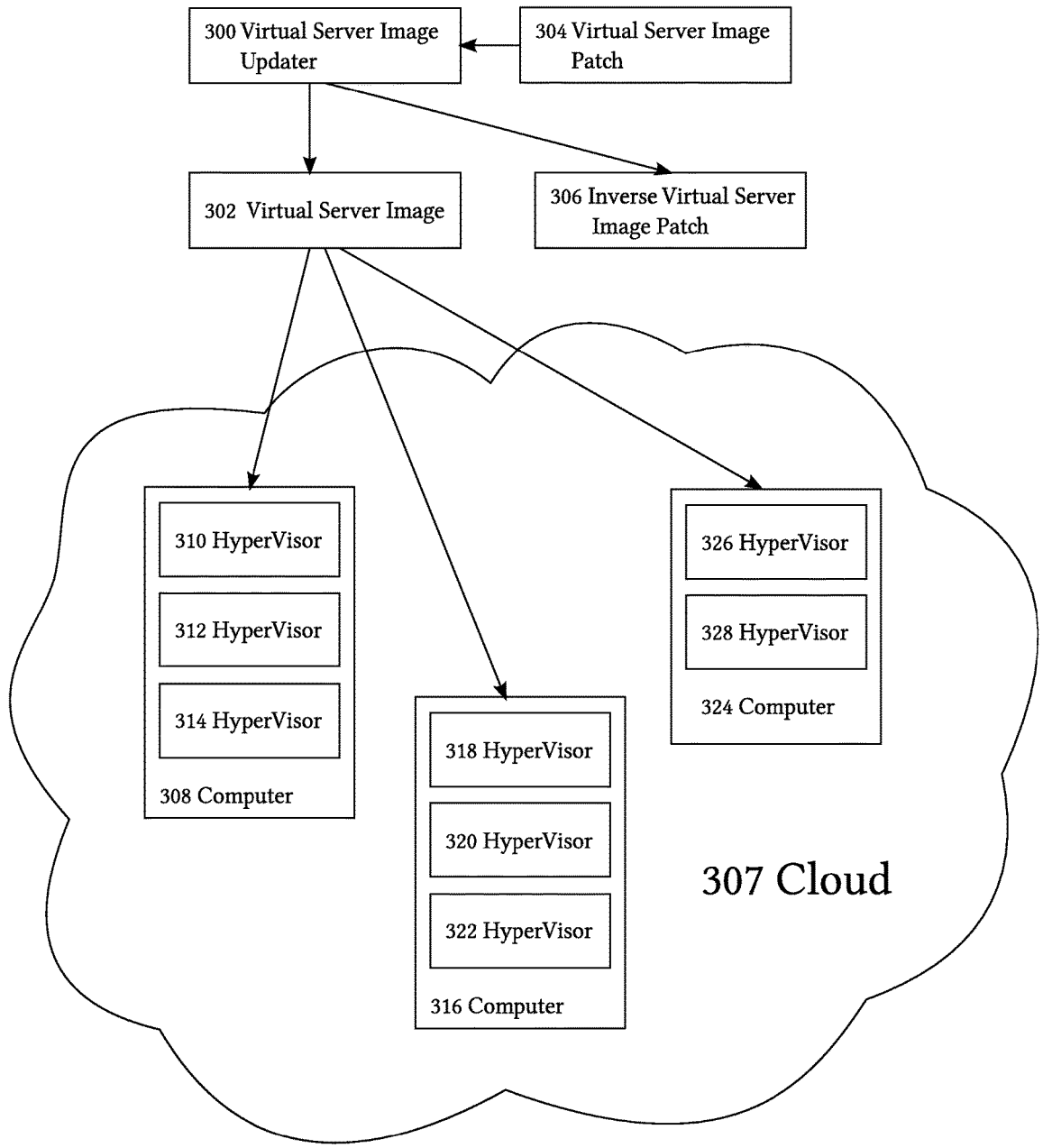
FIG. 3 shows an illustration of how a virtual server image can be reconfigured and then deployed to a cloud, in accordance with an embodiment.

FIG. 3 shows an illustration of how a virtual server image can be reconfigured and then deployed to a cloud, in accordance with an embodiment. As shown in FIG. 3, the virtual server image updater 300 updates a virtual server image to create an updated or reconfigured virtual server image 302, using the virtual server image patch file 304. The virtual server image is as a result updated, and an inverse patch file is generated 306. The inverse patch file is useful if the patched virtual server image misbehaves, or for any other reason the original behavior must be restored. The new virtual server image is then distributed (for example, in an embodiment by using NFS or scp (secure copy)) to one or more computers 308, 316 and 324 in a cloud 307, wherein each of the computers comprises one or more hypervisors 310, 312, 314, 318, 320, 322, 326, 328. The hypervisors then boot the reconfigured virtual server image.

Figure 4:
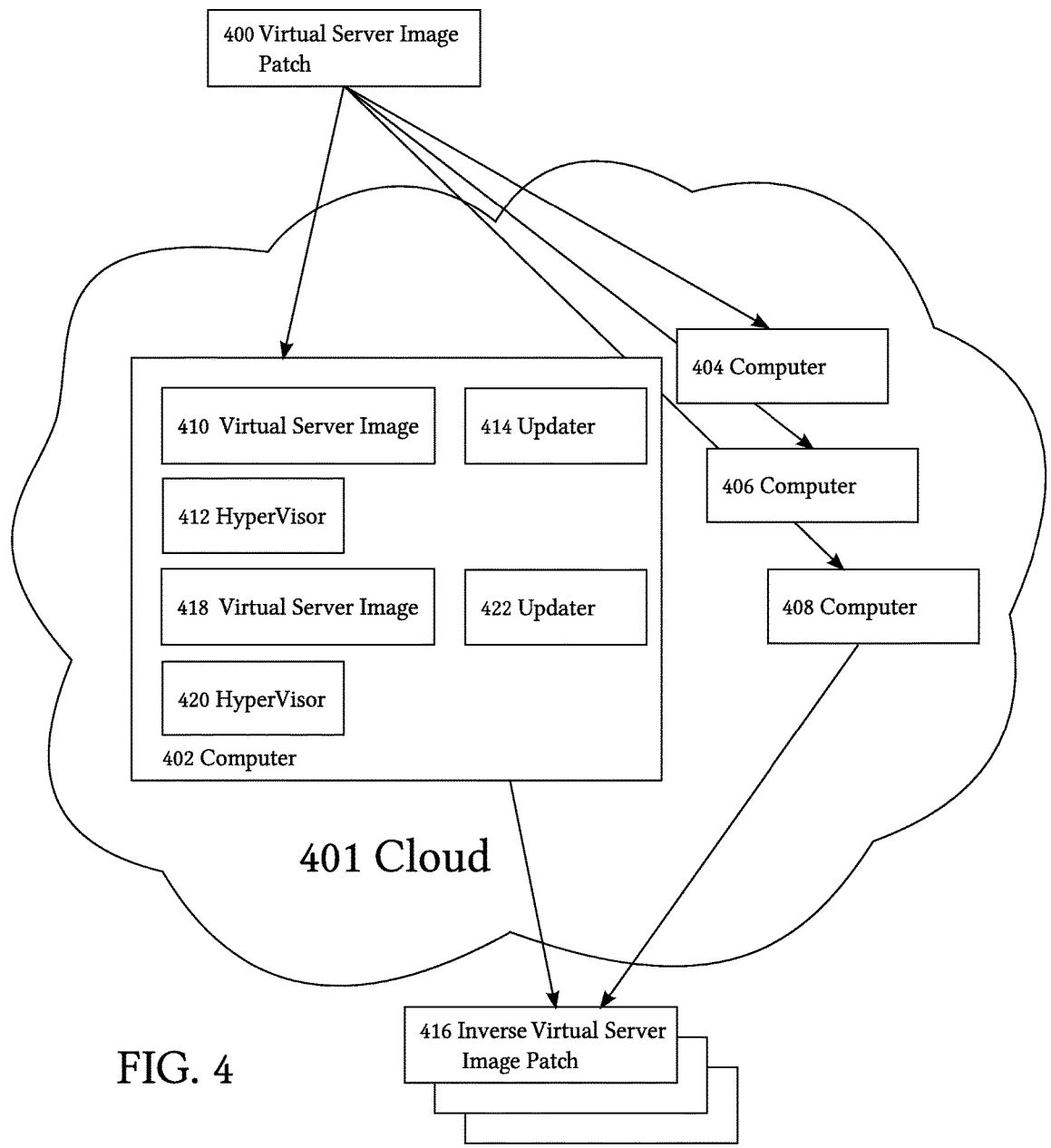
FIG. 4 shows an illustration of how virtual server images already deployed in a cloud can be reconfigured, in accordance with an embodiment.

FIG. 4 shows an illustration of how virtual server images already deployed in a cloud can be reconfigured, in accordance with an embodiment. As shown in FIG. 4, a virtual server image patch file 400 is distributed (again, for example, using NFS or scp (secure copy)) to the computers within a cloud 401. In each of the computers 402, 404, 406, 408 the hypervisors are shut down, and a virtual server image updater 414,422 is run for each virtual server image 410, 418. The hypervisors are then restarted on the updated virtual server images. The generated inverse patch files are collected 416 (again, for example, using NFS or scp (secure copy) or locally at each computer) to be used later, if the patch has to be rolled back. In accordance with an embodiment the updater is part of the hypervisor. In accordance with other embodiments the updater fetches the patch automatically from a patch server.

Figure 5:
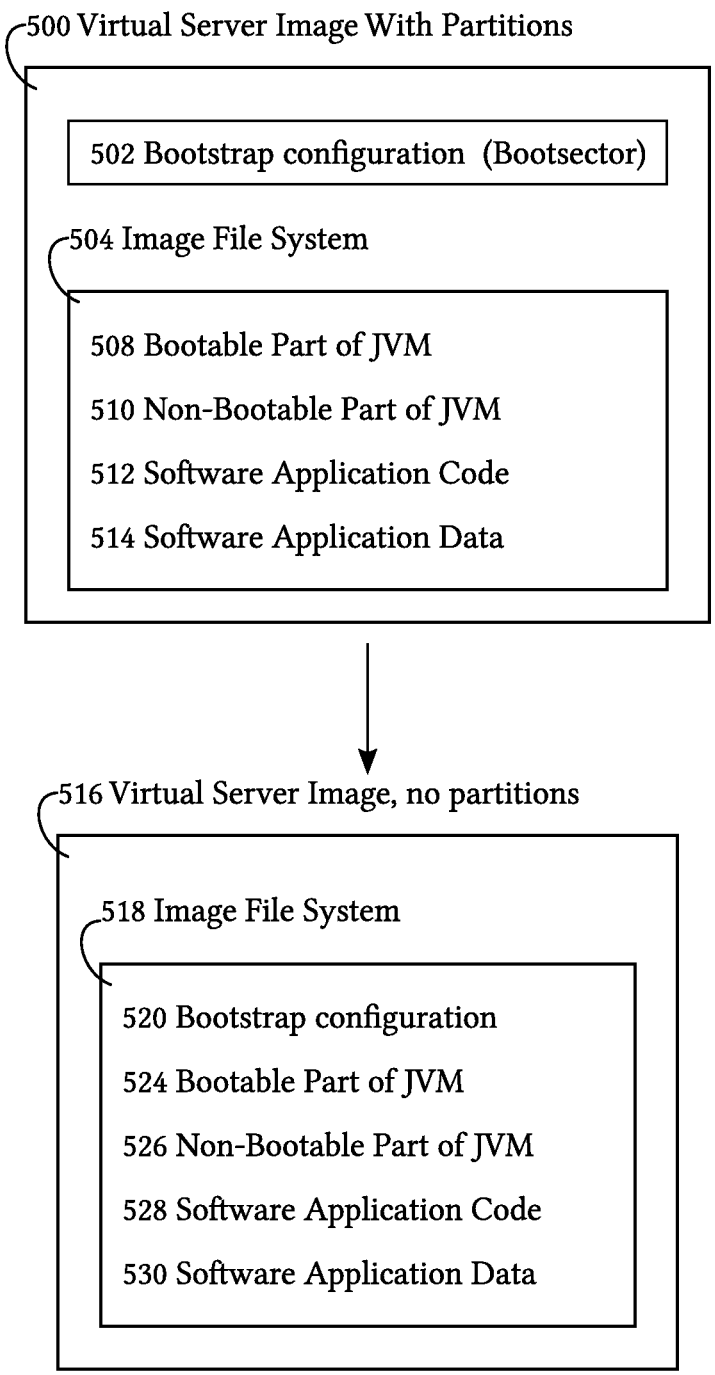
FIG. 5 shows an illustration of how a virtual machine image can be reconfigured from one hypervisor format to a different hypervisor format.

FIG. 5 shows an illustration of how a virtual machine image can be reconfigured from a first hypervisor format to a second or different hypervisor format, in accordance with an embodiment. As shown in FIG. 5, the virtual server image 500 is compatible with a VMWare hypervisor, and therefore the image is formatted as if it was the contents of a hard drive, e.g. it will have partitions and a bootsector 502 in the master boot record. One of the partitions will be the file system 504 comprising the bootable 508 and non-bootable 510 part of the JVM, as well as the software application code 512 and the software application data 514. In accordance with an embodiment, the updater can rewrite this virtual server image into a virtual server image compatible with, e.g. an OracleVM hypervisor 516, by extracting only the partition containing the image file system 518. The new virtual server image contains the copied contents of 508, 510, 512, 514 stored into 524, 526, 528, 530. The boot information embedded in the bootsector that was previously the exact location (head/track/sector) on disk for /baremetal/boot.bin, will instead now be stored as a file name in the bootstrap configuration 520 located within the file system (in an embodiment /boot/menu.cfg).

The above action is provided by way of example. In accordance with various embodiments, the updater is not limited to the above actions, but can also, e.g. resize the appliance to remove excessive virtual server image memory that is not in use, or to increase it for anticipated future use, or other actions. The updater can also record which patches have been applied to the virtual server image (in an embodiment this is recorded in the /patch_history.txt file within the file system within the virtual server image).

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for deploying a virtual server image to a cloud environment, comprising:
   one or more computers, executing within a cloud environment, wherein each computer includes a processor and one or more hypervisors, wherein the one or more computers incudes a first type of hypervisor, wherein the first type of hypervisor enables virtual server images compatible with the first type of hypervisor to be booted therein using a bootstrap configuration in each of the virtual server images;
   a virtual server image compatible with a second type of hypervisor, wherein the virtual server image when executed by the second type of hypervisor provides a virtual machine environment for use by a software application included within the virtual server image, wherein the virtual server image includes a bootstrap configuration, a bootable part of a virtual machine, and a non-bootable part of the virtual machine; and
   a virtual server image updater associated with the first type of hypervisor within the cloud environment, wherein the virtual server image updater receives and configures the virtual server image to be compatible with the first type of hypervisor, for execution by the first type of hypervisor, including
   mounting the virtual server image locally, as a file system that includes a plurality of directories corresponding to the bootable and non-bootable parts of the virtual machine,
   selectively modifying the file system while mounted, to configure one or more of the bootable and non-bootable parts of the virtual machine to match a bootstrap configuration required by the first type of hypervisor within the cloud environment,
   moving the bootstrap configuration from one location to another within the virtual server image,
   changing a configuration setting of the virtual server image to increase or reduce memory to be allocated for the virtual server image, and
   providing the modified file system to the first type of hypervisor, as a reconfigured virtual server image, for execution thereon.

2. The system of claim 1, wherein the system includes a plurality of hypervisors, and wherein each hypervisor is associated with its own virtual server image updater which receives the virtual server image and configures the virtual server image for execution by that hypervisor.

3. The system of claim 1, wherein the virtual server image updater is provided as part of the hypervisor with which it is associated, and wherein that hypervisor receives the virtual server image and configures the virtual server image for execution by that hypervisor.

4. The system of claim 1, including a first computer having a first hypervisor, and a second computer having a second hypervisor,
   wherein the first hypervisor and the second hypervisor are of different type requiring a different bootstrap configuration, and wherein the virtual server image updater that is associated with each hypervisor which receives the virtual server image, reconfigures the virtual server image from an original content, to a reconfigured content, to match the bootstrap configuration required by the receiving hypervisor.

5. The system of claim 1, wherein the virtual machine is a Java virtual machine included in the virtual server image.

6. The system of claim 5, wherein the Java virtual machine is bootable and comprises a minimal operating system suitable only to run a single Java virtual machine instance.

7. The system of claim 1, wherein the virtual server image is compatible with a plurality of hypervisors for server virtualization.

8. A method for deploying a virtual server image to a cloud environment, comprising:
providing, at one or more computers executing within a cloud environment, one or more hypervisors, wherein the one or more computers incudes a first type of hypervisor, wherein the first type of hypervisor enables virtual server images compatible with the first type of hypervisor to be booted therein using a bootstrap configuration in each of the virtual server images;
providing a virtual server image compatible with a second type of hypervisor, wherein the virtual server image when executed by the second type of hypervisor provides a virtual machine environment for use by a software application included within the virtual server image, wherein the virtual server image includes a bootstrap configuration, a bootable part of a virtual machine, and a non-bootable part of the virtual machine; and
a virtual server image updater associated with the first type of hypervisor within the cloud environment, wherein the virtual server image updater receives and configures the virtual server image to be compatible with the first type of hypervisor, for execution by the first type of hypervisor, including
mounting the virtual server image locally, as a file system that includes a plurality of directories corresponding to the bootable and non-bootable parts of the virtual machine,
selectively modifying the file system while mounted, to configure one or more of the bootable and non-bootable parts of the virtual machine to match a bootstrap configuration required by the first type of hypervisor within the cloud environment,
moving the bootstrap configuration from one location to another within the virtual server image,
changing a configuration setting of the virtual server image to increase or reduce memory to be allocated for the virtual server image, and
providing the modified file system to the first type of hypervisor, as a reconfigured virtual server image, for execution thereon.

9. The method of claim 8, wherein the system includes a plurality of hypervisors, and wherein each hypervisor is associated with its own virtual server image updater which receives the virtual server image and configures the virtual server image for execution by that hypervisor.

10. The method of claim 9, wherein the virtual server image updater is provided as part of the hypervisor with which it is associated, and wherein that hypervisor receives the virtual server image and configures the virtual server image for execution by that hypervisor.

11. The method of claim 8, including a first computer having a first hypervisor, and a second computer having a second hypervisor,
wherein the first hypervisor and the second hypervisor are of different type requiring a different bootstrap configuration, and
wherein the virtual server image updater that is associated with each hypervisor which receives the virtual server image, reconfigures the virtual server image from an original content, to a reconfigured content, to match the bootstrap configuration required by the receiving hypervisor.

12. The method of claim 8, wherein the virtual machine is a Java virtual machine included in the virtual server image.

13. The method of claim 12, wherein the Java virtual machine is bootable and comprises a minimal operating system suitable only to run a single Java virtual machine instance.

14. The method of claim 8, wherein the virtual server image is compatible with a plurality of hypervisors for server virtualization.

15. A non-transitory computer readable storage medium including instructions stored thereon which when read and executed by one or more computers cause the one or more computers to perform the steps comprising:
providing, at one or more computers executing within a cloud environment, one or more hypervisors, wherein the one or more computers incudes a first type of hypervisor, wherein the first type of hypervisor enables virtual server images compatible with the first type of hypervisor to be booted therein using a bootstrap configuration in each of the virtual server images;
providing a virtual server image compatible with a second type of hypervisor, wherein the virtual server image when executed by the second type of hypervisor provides a virtual machine environment for use by a software application included within the virtual server image, wherein the virtual server image includes a bootstrap configuration, a bootable part of a virtual machine, and a non-bootable part of the virtual machine; and
a virtual server image updater associated with the first type of hypervisor within the cloud environment, wherein the virtual server image updater receives and configures the virtual server image to be compatible with the first type of hypervisor, for execution by the first type of hypervisor, including
mounting the virtual server image locally, as a file system that includes a plurality of directories corresponding to the bootable and non-bootable parts of the virtual machine,
selectively modifying the file system while mounted, to configure one or more of the bootable and non-bootable parts of the virtual machine to match a bootstrap configuration required by the first type of hypervisor within the cloud environment,
moving the bootstrap configuration from one location to another within the virtual server image,
changing a configuration setting of the virtual server image to increase or reduce memory to be allocated for the virtual server image, and
providing the modified file system to the first type of hypervisor, as a reconfigured virtual server image, for execution thereon.

16. The non-transitory computer readable storage medium of claim 15, wherein the system includes a plurality of hypervisors, and wherein each hypervisor is associated with its own virtual server image updater which receives the virtual server image and configures the virtual server image for execution by that hypervisor.

17. The non-transitory computer readable storage medium of claim 15, wherein the virtual server image updater is provided as part of the hypervisor with which it is associated, and wherein that hypervisor receives the virtual server image and configures the virtual server image for execution by that hypervisor.

18. The non-transitory computer readable storage medium of claim 15, including a first computer having a first hypervisor, and a second computer having a second hypervisor,
   wherein the first hypervisor and the second hypervisor are of different type requiring a different bootstrap configuration, and
   wherein the virtual server image updater that is associated with each hypervisor which receives the virtual server image, reconfigures the virtual server image from an original content, to a reconfigured content, to match the bootstrap configuration required by the receiving hypervisor.

19. The non-transitory computer readable storage medium of claim 15, wherein the virtual machine is a Java virtual machine included in the virtual server image.

20. The non-transitory computer readable storage medium of claim 19, wherein the Java virtual machine is bootable and comprises a minimal operating system suitable only to run a single Java virtual machine instance.

\* \* \* \* \*